(12) United States Patent
Okamori et al.

(10) Patent No.: US 6,575,580 B2
(45) Date of Patent: Jun. 10, 2003

(54) LIGHTING SYSTEM AND PROJECTION TYPE DISPLAY UNIT USING THEREOF

(75) Inventors: Shinji Okamori, Tokyo (JP); Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 162 days.

(21) Appl. No.: 09/819,734

(22) Filed: Mar. 29, 2001

(65) Prior Publication Data

US 2002/0008791 A1 Jan. 24, 2002

(30) Foreign Application Priority Data

May 31, 2000 (JP) .......................................... 2000-161868

(51) Int. Cl.[7] .............................................. G03B 21/28
(52) U.S. Cl. .......................................... 353/98; 362/268
(58) Field of Search .......................... 358/98; 362/257, 362/268; 355/67; 349/5

(56) References Cited

U.S. PATENT DOCUMENTS 6,454,438 B1 * 9/2002 Wada .......................... 362/268

FOREIGN PATENT DOCUMENTS

| JP | A10161237 | 6/1998 |
| JP | B2939237 | 6/1999 |

OTHER PUBLICATIONS

Hornbeck, SPIE, vol. 3013, pp. 27–40, (1997).

* cited by examiner

Primary Examiner—Russell Adams
Assistant Examiner—Michelle Nguyen
(74) Attorney, Agent, or Firm—Birch, Stewart, Kolasch & Birch, LLP

(57) ABSTRACT

A lighting system comprising converging means (1, 2) for converging a light emitted from an illuminant to form a converged image, a light mixing element 3 for having an end face of incidence 31 near the position at which the converged image is formed, and reducing an irregular luminance of the converged image of the illuminant to form a uniform light source face on an end face of emergence 32, and an optical system for transmission for directing an illuminating light flux from the plane of light emergence onto the illuminated face 5 side in a non-telecentric state, a first lens group 45 and a second lens group 46 being arranged in order from the light mixing element 3 side to the illuminated face 5 side of a light bulb, in which a first optical conjugate relation exists between the end face of incidence 31 of the light mixing element 3 and a virtual face at a position of a aperture stop 6 disposed in the vicinity of a lens means final face closest to the illuminated face constituting the second lens group in terms of the first lens group and the second lens group, and a second optical conjugate relation exists between the end face of emergence of the light mixing element 3 and the illuminated face 5.

8 Claims, 15 Drawing Sheets

12

LIGHTING SYSTEM AND PROJECTION TYPE DISPLAY UNIT USING THEREOF

BACKGROUND OF THE INVENTION

The present invention relates to an optical system for illumination (lighting system) for applying an illuminating light to a light bulb such as a liquid crystal or DMD (Digital Micromirror Device) and a projection type display unit using the same, and more particularly to an optical system for illumination (lighting system) for a projection type display unit that is excellent in the illumination uniformity, and has a high light utilization efficiency, and the projection type display unit using this optical system for illumination (lighting system).

In recent years, a projector device (projection type display unit) as an image display device of large screen has drawn a good deal of public attention.

A CRT projector device using a high definition and high luminance CRT of small size, a liquid crystal projector device using a liquid crystal panel, and a DMD projector device using a DMD (Digital Micromirror Device) have been manufactured.

Various products not only coping with the AV sources such as movies or TV programs, but also belonging to a category called a data projector for projecting the computer image, have extended rapidly the market. The remarkable improvements of performance including the enhanced brightness or contrast, higher resolution, and more uniform brightness of the projection screen, have been made.

Particularly, a projector device using a light bulb such as the liquid crystal or DMD is superior to a CRT projector device in the respect of capability of enhancing the brightness and resolution independently, and has been more applied to the projection television (rear projection type projector).

The conventional light bulb optical system for illumination (lighting system) typically relies on a Koehler illumination method of one kind in which a light bulb is arranged and illuminated in the optical path of a lens system in a conjugate relation between a light source and an exit pupil of a projection lens.

However, to improve the illumination uniformity in recent years, a fly-eye integrator method or a rod integrator method has been mostly employed, and an image forming performance at higher level and a more intricate constitution have been required for the optical system for illumination (lighting system).

FIG. 17 shows a conventional reflection type projector as disclosed in Japanese Patent No. 2939237.

In the figure, reference numeral 110 denotes alight source for generating and emitting a light; reference numeral 120 denotes a color wheel for selectively transmitting the light emitted from the light source 110 with the wavelength; reference numeral 130 denotes light mixing means (light mixing element) for diverging/converging or irregularly reflecting the light incident from the light source 110 into the uniform light; reference numeral 140 denotes a relay lens unit for converging the incident light into the parallel light; reference numeral 150 denotes a critical angle prism for reflecting the light reflected and incident again from image generating means 160; and reference numeral 170 denotes a projection lens unit for enlarging and transmitting the incident light to be directed toward a screen.

As a specific example of the light mixing means 130, a scrambler 135 is arranged in the figure.

Reference numerals 135a and 135b denote a plane of incidence and a plane of emergence for the scrambler 135, respectively. At a point to which a light emitted from a lamp 111 of the light source 110 is converged, the plane of incidence 135a perpendicular to the optical path is arranged. This plane of incidence 135a, the plane of emergence 135b perpendicular to the optical path and four lateral faces form a rectangular parallelepiped.

An aspect ratio of the plane of emergence 135b results in a rectangle corresponding to that of an FLCD (Ferroelectric Liquid Crystal Display) constituting the image generating means 160.

A nonuniform light from the light source 110 is mixed into the uniform light by the scrambler 135, and emitted from the plane of emergence 135b.

The relay (transmission) lens unit 140 is composed of a convergent lens 141 for diverging this uniform light, and a collimator lens 143 for converging the incident divergent light into the parallel light. This parallel light illuminates the FLCD 163.

With this conventional constitution, a reflection type projector can be provided in which the critical angle prism 150 is employed to transform a proceeding path of light, without the use of a polarizing beam splitter, and the arrangement of optical axes for the optical system can be easily made without need of a long optical length.

The critical angle prism 150 is not described in detail here, but has a lot of problems with degrading the resolution of a projected image, easily causing an unnecessary ghost light, and increasing the costs owing to significant difficulties in the manufacture, except for an action of separating optically and physically the optical system for illumination and the optical system for projection.

In the case where the critical angle prism 150 is not employed, there is the high possibility of bringing about the problem with physical interference between the optical system for illumination and the optical system for projection.

In the conventional examples, an instance was disclosed in which a DMD was employed as the image generating means, but when the DMD is employed, the interference problem can not be mostly avoided.

The DMD acts to modulate an incident light flux on the basis of the image information by changing the tilt of a micromirror to select a reflecting direction of the incident light.

Hence, the incident angle of rays illuminating the DMD is limited, causing interference between the optical system for illumination and the optical system for projection.

FIG. 18 is a perspective view illustrating the constitution of two pixels of DMD.

In the figure, reference numerals 510, 511 denote micromirrors, which are tilted by +10 degrees and −10 degrees from the normal of an element 500, respectively.

For more details of the DMD, see Larry J. Hornbeck, "Digital Light Processing for High-Brightness, High-Resolution Applications." SPIE Vol.3013, pp.27–40. The DMD will not be described in any detail.

In order to illuminate the DMD, the ray of light must be incident from a direction inclined at a certain angle from the normal of the DMD, as will be apparent from the operation of the micromirror.

The micromirror is tilted at an angle of ±10 degrees, and the rotational axis of the micromirror is directed at 45 degrees toward the square micromirror. Therefore, in the case where a reflected light is directed in a normal direction of the DMD, an illuminating light must be made incident from a direction inclined by 20 degrees from the normal and with an azimuth of 45 degrees.

FIG. 19 is a schematic view illustrating part of an optical system employing the DMD as image generating means, wherein the physical interference between the optical system for illumination and the optical system for projection is described in the case where the critical angle prism is not used.

In the figure, reference numeral 440 denotes a final lens of the optical system for illumination; reference numeral 441 denotes a lens-barrel of the final lens 440; reference numeral 512 denotes a DMD; reference numeral 70 denotes an optical axis of illumination; reference numeral 71 denotes an optical axis of projection; reference numeral 80 denotes a projection lens; and reference sign α denotes an admission angle of the ray of beam on the DMD 512, or an angle made between the optical axis of illumination 70 and the normal of the DMD 512.

The projection lens 80 is placed in the front of the DMD 512, and is supposed to be a post diaphragm type in the figure.

In the case where the tilt of the micromirror for the DMD 512 is ±10 degrees, the incident angle of the ray of light onto the DMD 512 must be α=20°, leading to the high possibility that the physical interference may arise in the vicinity of a section circled by the dotted line in the figure.

In this case, a part of the illuminating light flux or projecting light flux is intercepted, and the illumination or projection performance may be sacrificed.

In order to avoid such an inconvenience, it was required to reduce an incident aperture diameter of the projection lens, or delete part of the lens-barrel intentionally, for example.

However, since these are factors of causing the poor performance of the projection lens or the increased costs, in practice a method is often taken of shifting the optical axis of the projection lens with respect to the central axis of the DMD by a predetermined amount, as shown in FIG. 20. Note that the same numerals indicate the same or like parts as in FIGS. 19 and 20. The same parts are not described.

If the optical axis is shifted, the projecting direction of a projector device becomes upward from the device, and this technique is positively employed in the case of a front projector.

Of course, it is necessary that the incident angle of the illuminating light with respect to the normal of the DMD may be made a larger angle β by a shift amount of the projection lens 80. Further, a large image circle of the projection lens 80 must be designed than in a case of FIG. 19.

However, in the system in which the inclination of the projecting direction is not permissible, the problem of interference is difficult to avoid, and a method of placing the critical angle prism was adopted, for example, resulting in the increased cost.

SUMMARY OF THE INVENTION

The present invention has been achieved to solve the above-mentioned problems, and it is an object of the invention to provide an optical system for illumination (lighting system), and a projector device (projection type display unit) using the optical system for illumination (lighting system), by directing an illuminating light flux to a reflective type light bulb represented by a DMD, without the use of expensive optical elements such as a critical angle prism, wherein there is no significant effect on the illumination performance, particularly the illumination uniformity, even if the illuminating light flux is partly intercepted.

According to the present invention, there is provided a lighting system comprising converging means for converging a light emitted from an illuminant and forming a converged image of the illuminant at a predetermined position, a light mixing element for having an end face of incidence near the position at which the converged image of the illuminant is formed, and reducing an irregular luminance of the converged image of the illuminant incident on the end face of incidence to form a uniform light source face on an end face of emergence, and an optical system for transmission for directing an illuminating light flux from the plane of light emergence onto the illuminated face side of a light bulb in a non-telecentric state, a first lens group and a second lens group being arranged in order from the light mixing element side to the illuminated face side of the light bulb, in which a first optical conjugate relation exists between the end face of incidence of the light mixing element and a virtual face at a position of a diaphragm disposed in the vicinity of a lens means final face closest to the illuminated face constituting the second lens group in terms of the first lens group and the second lens group, and a second optical conjugate relation exists between the end face of emergence of the light mixing element and the illuminated face.

In the lighting system according to the invention, the second lens group of the optical system for transmission is comprised of a meniscus lens having a negative refracting power with a convex face directed toward the light mixing element, and a lens having a positive refracting power, which are arranged in order from the light mixing element side.

In the lighting system according to the invention, the first lens group of the optical system for transmission consists of one positive lens and the second lens group consists of two positive lenses.

In the lighting system according to the invention, the light mixing element is shaped like a hollow cylinder formed by folding a single reflective member.

In the lighting system according to the invention, at least one of the first lens group and the second lens group of the optical system for transmission is a concave mirror or a convex mirror.

A projection type display unit according to the invention comprises a lighting system according to any one of aspects 1 to 5, a light bulb having a great number of pixels in a two-dimensional array structure that are illuminated by a light flux in a non-telecentric state that is emergent from an optical system for transmission of the lighting system, and that are driven independently of each other, and projection lens means for projecting the light emergent from the light bulb onto screen means.

In the projection type display unit according to this invention, an optical system for transmission in a lighting system has a first lens group and a second lens group arranged in order from the light mixing element side to the illuminated face side of a light bulb, the first lens group consisting of at least one meniscus lens having a positive refracting power, and the second lens group consisting of first lens means having a negative refracting power and second lens means having a positive refracting power in a region from the light mixing element side to the illuminated face side of the light bulb, the first lens means and the second lens means being arranged in order from the light source side, in which an illuminating light flux is made emergent in a non-telecentric state from the optical system for transmission, and a relation $$0.68 < f1/f0 < 0.76$$

is satisfied, where the focal length of an overall optical system for transmission is f0 and the focal length of the first lens group is f1.

In the projection type display unit according to the invention, a lighting system has a rotary color filter arranged immediately before or after the light mixing element.

DETAILED DESCRIPTION OF THE PREFERRED EMBODIMENTS

The preferred embodiments of the present invention will be specifically described below with reference to the drawings.

(Embodiment 1)

Generally, a projector device (projection type display unit) comprises a signal generating section for generating an electrical signal to drive a light bulb (e.g., a liquid crystal or DMD) to correspond to the electrical signal having the information of a video signal input from the outside, an optical system for illumination (lighting system) using a light mixing element described hereinafter, and screen means for receiving a light flux projected from an optical system for projection which is highly coordinated with this optical system for illumination (lighting system) and projecting an image on its screen.

Figure 1:
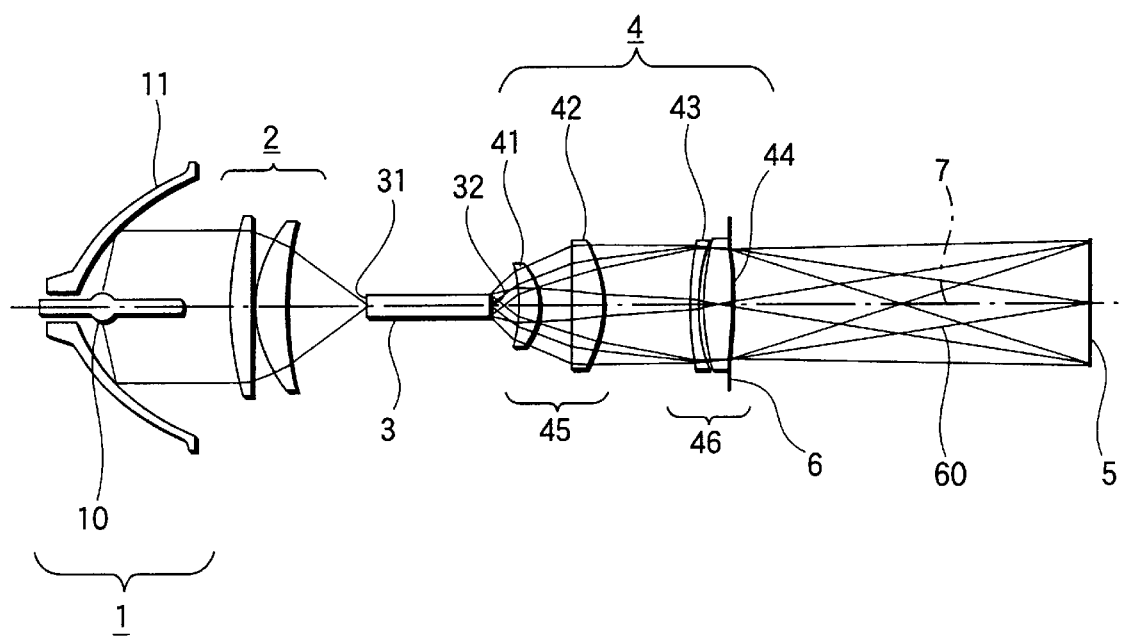
FIG. 1 is a view showing a configuration of a lighting system according to an embodiment 1 of the present invention.

FIG. 1 is a view showing a configuration of an optical system for illumination (lighting system) according to one embodiment of this invention.

In the figure, light converging means is constituted of a light source 1 made up of a light source lamp (illuminant) 10 and a reflector (reflecting mirror) 11, and a condenser lens system 2.

A light mixing element 3 includes an end face of incidence 31 and an end face of emergence 32 as a pair. Reference numeral 4 denotes a relay (transmission) lens system, and reference numeral 5 denotes an illuminated face of the light bulb.

The relay lens system (also referred to as a transmission lens system or an optical system for transmission) 4 is constituted of two groups of lens system, including a first lens group 45 having a first lens 41 and a second lens 42, and a second lens group 46 having a third lens 43 and a fourth lens 44.

A aperture stop 6 of the relay lens system (transmission lens system) 4 is placed in the neighborhood of the fourth lens 44.

In the figure, the dashed line 7 indicates the optical axis and the full lines (e.s. 60) typically indicates how the rays of light behave.

First of all, the operation of each constituent element will be described below in order from the light source 1 to the illuminated face 5 of the light bulb.

The light source lamp 10 has an illuminant for emitting a white light or a monochromatic light, in which a light radiated from the illuminant is converged or transformed into almost parallel rays of light by the reflector 11 in accordance with a predetermined light converging method.

For the former (i.e., converging the light flux), a method of employing a rotary elliptic mirror to dispose an illuminant in the neighborhood of a first focal point is well known, while for the latter (i.e., transforming the light flux into almost parallel rays of light), a method of employing a rotary parabolic mirror to dispose an illuminant in the neighborhood of its focal point.

The reflector 11 as illustrated in FIG. 1 is a rotary parabolic mirror, a light flux made almost parallel is converged by the condenser lens system 2 and led into the light mixing element 3.

The light mixing element 3 is one for making the light intensity uniform by reducing an irregular luminance that is incurred in a converged image of the light source 1 which is converged by the reflector 11 and the condenser lens system 2, and forms a uniform light source face that becomes an illuminating light source in the vicinity of the end face of emergence 32.

Therefore, the shape of the end face of emergence 32 in the light mixing element 3 is desirably similar fundamentally to that of the illuminated face 5 for the light bulb.

The light mixing element 3 forms a columnar bulk made of a transparent material such as an optical glass, heat resisting glass, or heat resisting resin. A principle for passing light is typically due to total reflection from an interface with the air, such as an optical fiber or kaleidoscope.

If the reflection from the side face of element is conducted efficiently, the total reflection may not be used for the transmission. Needless to say, it is possible to combine the reflection mirror pieces into a columnar configuration. The operation of the light mixing element will be detailed later.

The relay lens system 4 is configured to satisfy an image forming relation in which the end face of emergence of the light mixing element 3 and the illuminated face 5 of the light bulb are conjugated, and acts to transmit (or relay) a light from the end face of emergence 32 that is a uniform light source face onto the illuminated face 5 of the light bulb efficiently and illuminate the illuminated face 5.

At this time, a principal ray 60 of the illuminating light flux is incident on the illuminated face 5 of the light bulb in a tilted state with respect to the optical axis.

Namely, the illuminating light flux illuminates the illuminated face 5 of the light bulb in a non-telecentric state.

An optical system in which the principal ray of light is almost parallel to the optical axis is called a telecentric system, and the non-telecentric state signifies that the principal ray of light is not parallel to the optical axis.

The relay lens system 4 is made up of a positive meniscus lens 41 with the concave face directed toward the light source 1, a biconvex lens 42, a negative meniscus lens 43 with a convex face directed toward the light source 1, and a biconvex lens 44. The positive meniscus lens 41 and the biconvex lens 42 constitutes the first lens group 45, and the negative meniscus lens 43 and the biconvex lens 44 constitutes the second lens group 46. Both the first lens group 45 and the second lens group 46 have a positive refracting power.

Figure 2:
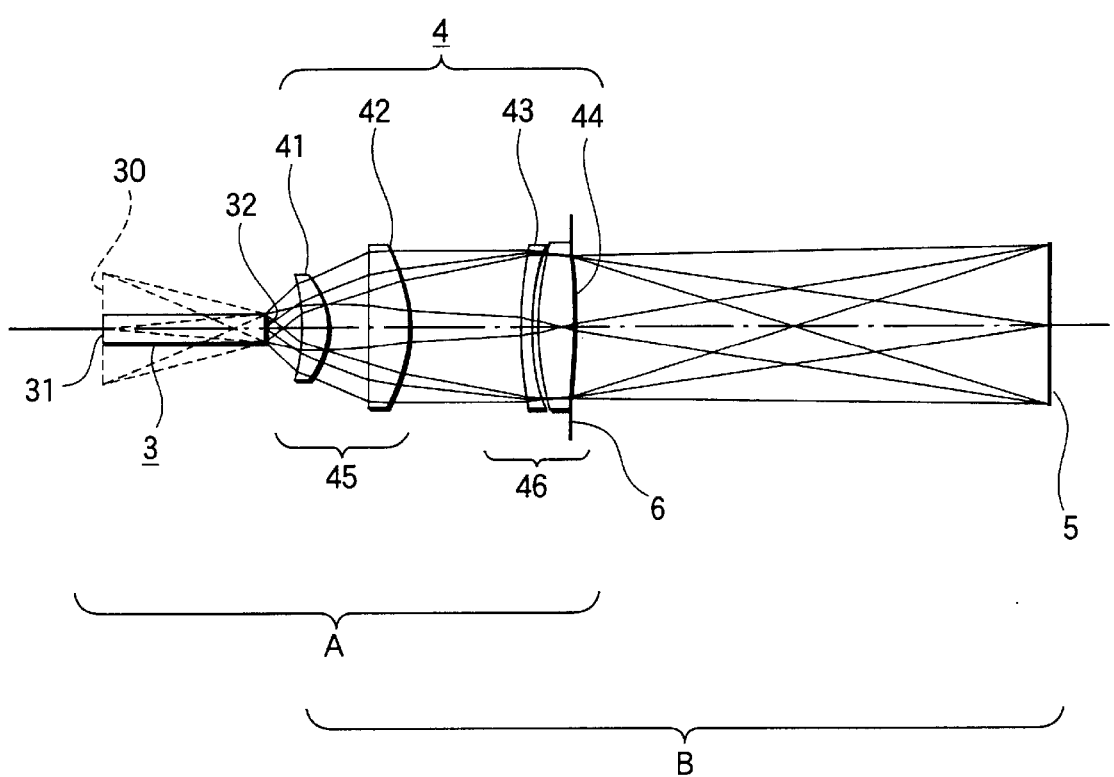
FIG. 2 is a schematic view for explaining an optical system for transmission according to the embodiment 1 of the invention.

FIG. 2 is a view typically showing how the rays of light are converged or diverged in a region from the light mixing element 3 in the optical system for illumination (lighting system) to the illuminated face of the light bulb.

In the figure, reference numeral 30 denotes a virtual light source face formed in the vicinity of the end face of incidence 31 of the light mixing element 3.

The relay lens system 4 effectuates two conjugate relations, a first optical conjugate relation in which a number of virtual light source images on the virtual light source face 30 is formed in the vicinity of the aperture stop 6, and a second optical conjugate relation in which a uniform light source face image on the end face of emergence 32 is formed in the vicinity of the illuminated face 5 of the light bulb.

In FIG. 2, a symbol A represents the first optical conjugate relation and a symbol B represents the second optical conjugate relation.

Figure 3:
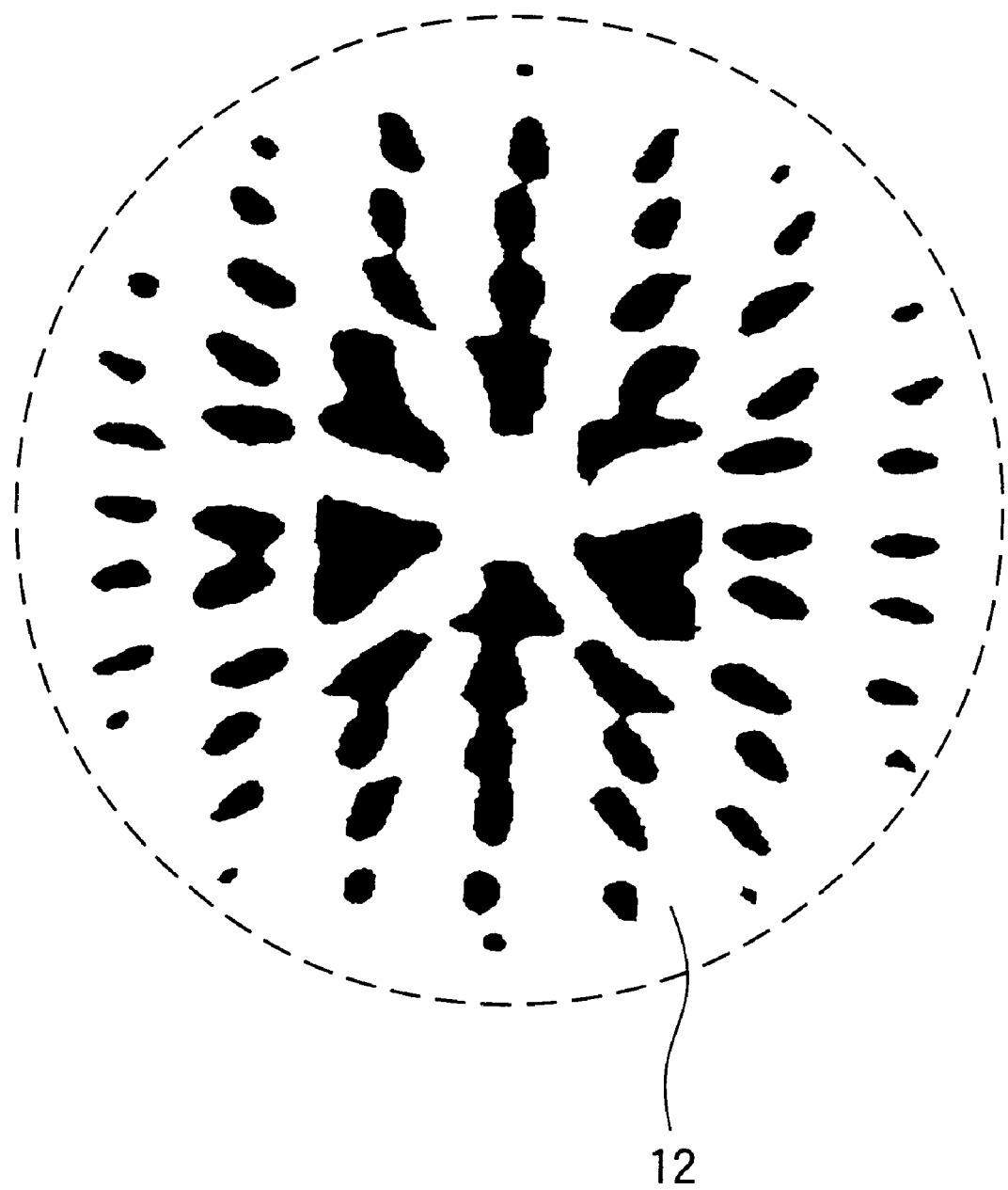
FIG. 3 is a schematic view for explaining many light source images according to the embodiment 1 of the invention.

FIG. 3 is a photograph of virtual light source images formed in the vicinity of the aperture stop 6 of the optical system for illumination (lighting system) according to this embodiment of the invention.

In the figure, this photograph is reversed in negative-positive manner, so that an illuminated region having high luminance is blackish.

A range encircled by the dotted line presents an outer shape of the biconvex lens 44. It can be found that the virtual light source images 12 extend almost up to the effective diameter of lens.

The light is divided into a number of light sources, and then convoluted again on the illuminated face 5 of the light bulb to illuminate it uniformly.

Figure 4:
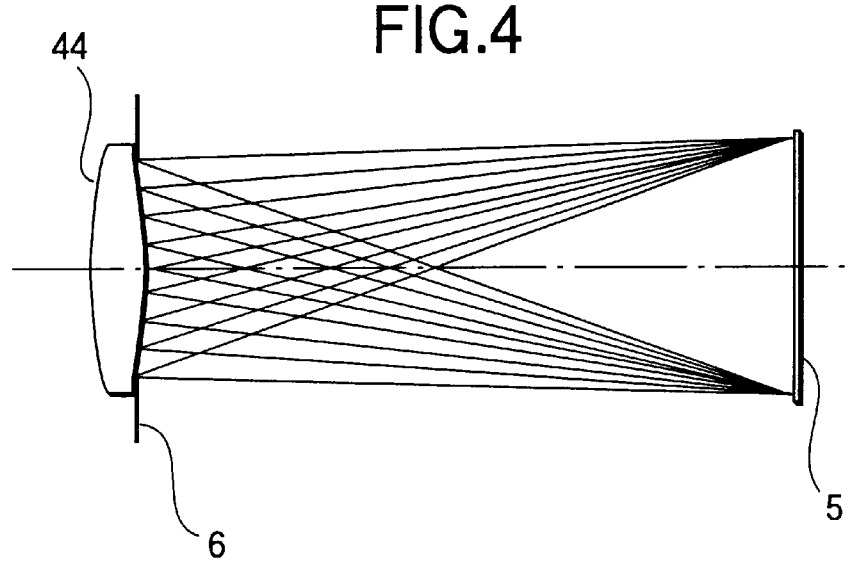
FIG. 4 is a view for explaining the behavior of the rays of light from many light source images according to the embodiment 1 of the invention.

FIG. 4 is a view typically illustrating a convoluted illumination of the virtual light source images.

The virtual light source images in a multiple manner is formed due to the action of the light mixing element 3.

Figure 5:
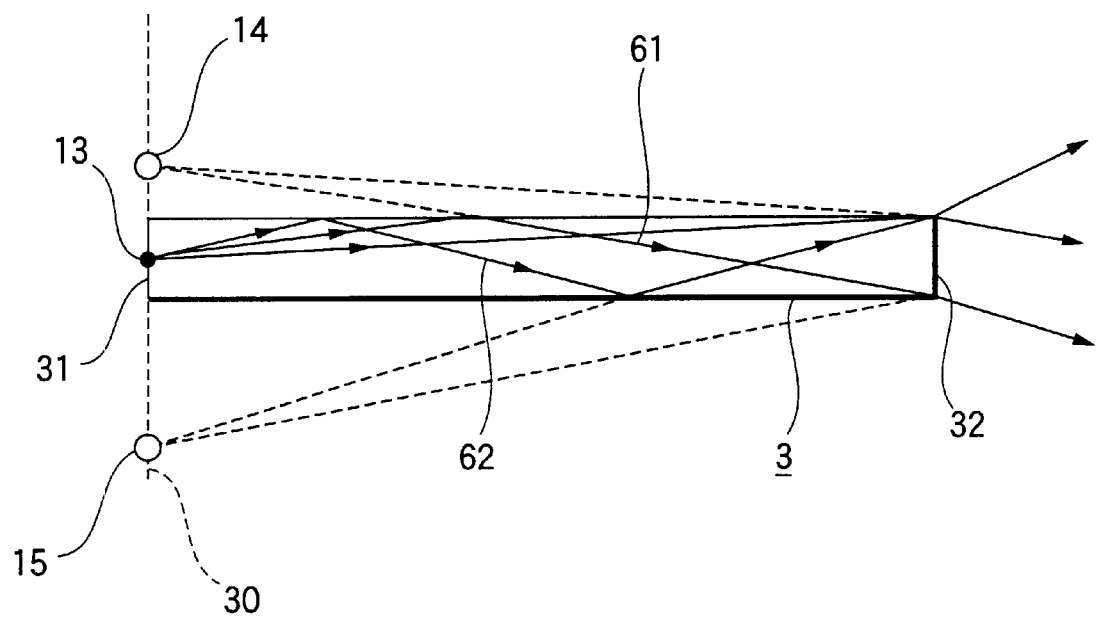
FIG. 5 is a view for explaining the operation of a light mixing element according to the embodiment 1 of the invention.

FIG. 5 is a view for explaining the action in which many virtual light sources are formed. Reference numeral 13 denotes an illuminant image of the light source lamp 10; 14, 15 denote virtual illuminant images; and 61, 62 typically denote the rays of light travelling through the light mixing element 3.

The light mixing element 3 is a columnar element made of a transparent medium such as glass, and placed within the air or a medium having a lower refractive index than the transparent medium.

A light incident on the end face of incidence 31 is totally reflected repetitively from the interface in the same principle of the optical fiber or kaleidoscope to proceed to the end face of emergence.

As seen from the end face of emergence 32, it can be observed as if the virtual illuminant images 14 and 15 were separated within the virtual light source face 30. A ray of light 61 is reflected once from the side face, and a ray of light 62 is reflected twice. In this way, the number of reflections within the element determines the position of virtual light source and the number of separations.

By the way, in this embodiment, the aperture stop 6 of the relay lens system 4 is set in the vicinity of the second lens group 46, and many virtual light source images can be formed owing to the action of the light mixing element 3. Therefore, the problem with the physical interference between the optical system for projection and the optical system for illumination can be solved without greatly degrading the performance of the optical system for illumination (lighting system).

Figure 6:
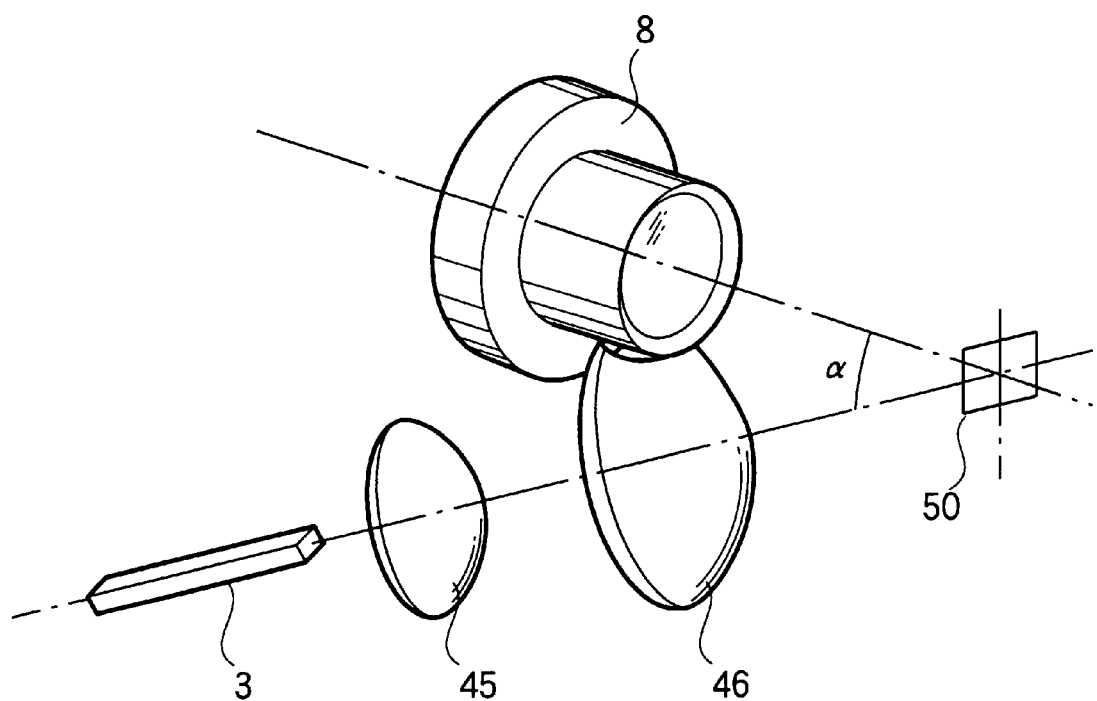
FIG. 6 is a view showing a state where part of an optical system for illumination and part (lens-barrel) of a projection lens in an optical system for projection are interrupted in the embodiment 1.

FIG. 6 is a view typically illustrating a state where a part of the optical system for illumination (lighting system) is intercepted by a lens-barrel of the projection lens.

In the figure, reference numeral 8 denotes the projection lens; 50 denotes a DMD; and 45, 46 denote lenses representing the first lens group and the second lens group, respectively.

Other reference numerals are the same as previously described.

In FIG. 6, the projection lens 8 and the lens 46 interfere physically.

Figure 7:
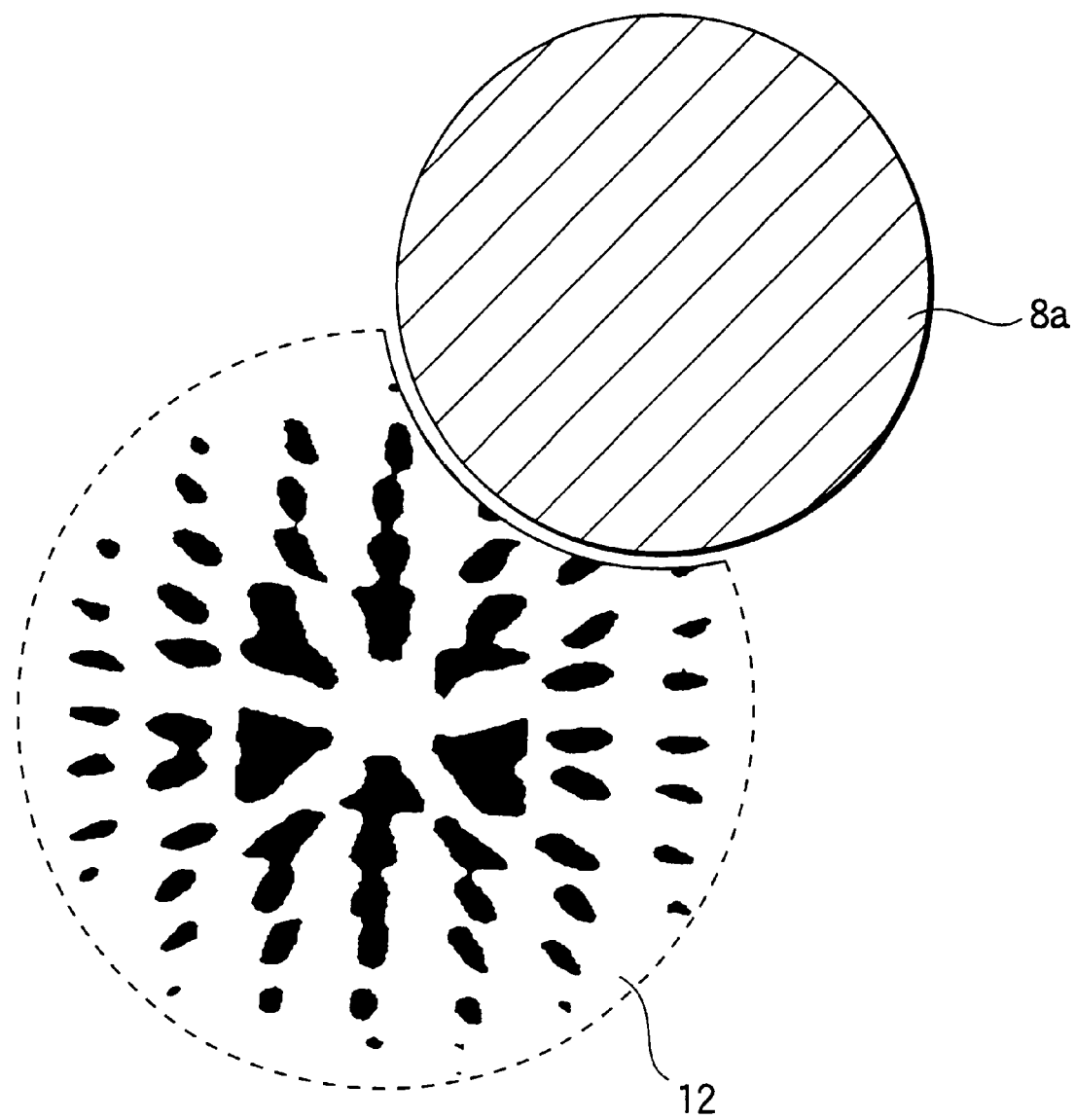
FIG. 7 is a view typically showing a state where part of virtual light source images is intercepted by the projection lens in the embodiment 1.

FIG. 7 is a view showing typically a state where the virtual light source images as shown in FIG. 3 are partly intercepted by the projection lens 8.

In the figure, reference numeral 8a denotes a circle indicating the cross section of the projection lens 8; and 12 denotes many virtual light source images.

At this time, the virtual light source images are partly intercepted in the second lens group.

As will be apparent from FIG. 7, of many virtual light sources, the light having a large angular component formed outside is intercepted.

Thus, the above physical interference state was set in a computer model, and it was confirmed how the illumination performance was retained.

Figure 8:
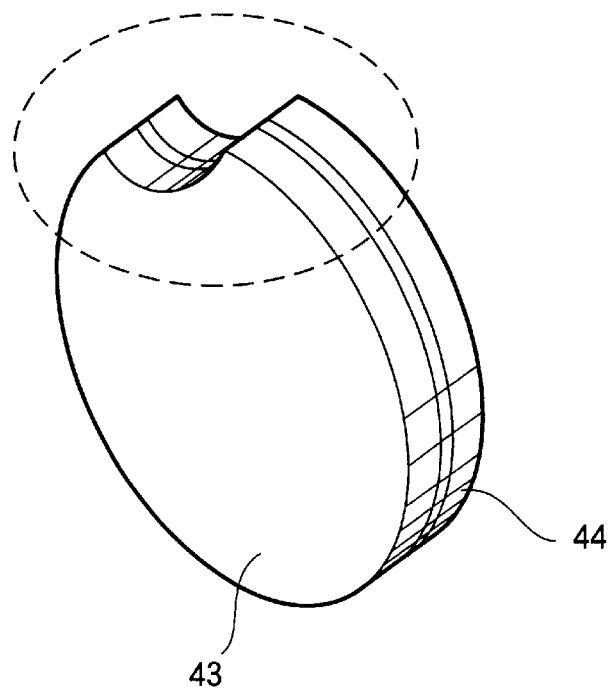
FIG. 8 is a schematic view for explaining a partial missing of the second lens group according to the embodiment 1.

FIG. 8 shows a partially missing model of the second lens group. In the figure, a region encircled by an ellipse of the dotted line indicates a missing lens portion.

Figure 9:
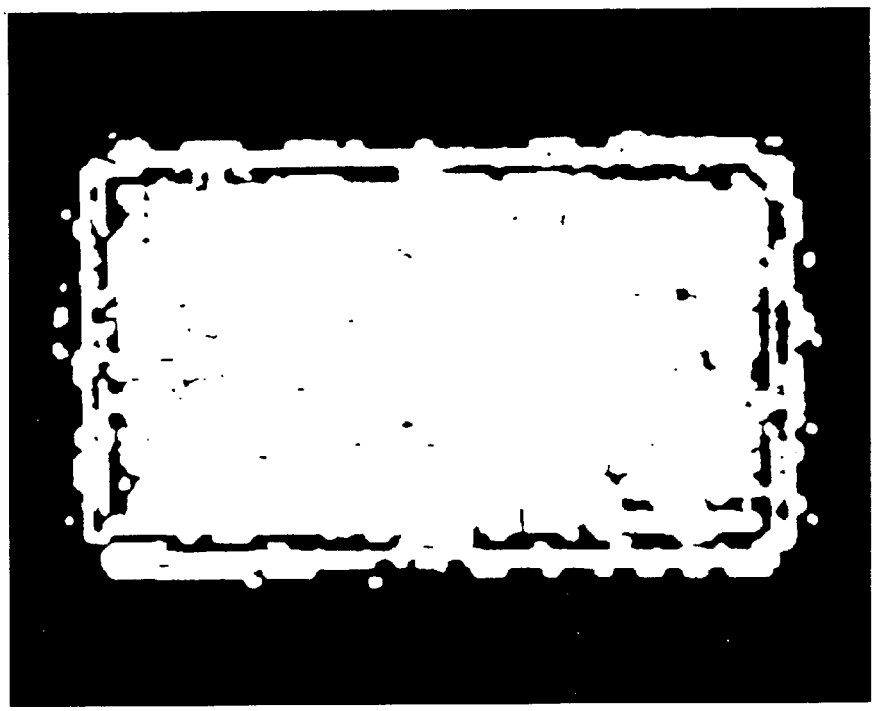
FIG. 9 is a view showing an intensity distribution of the illuminated face of the light bulb by computer simulation in the case where a part of the second lens group is missing.
Figure 10:
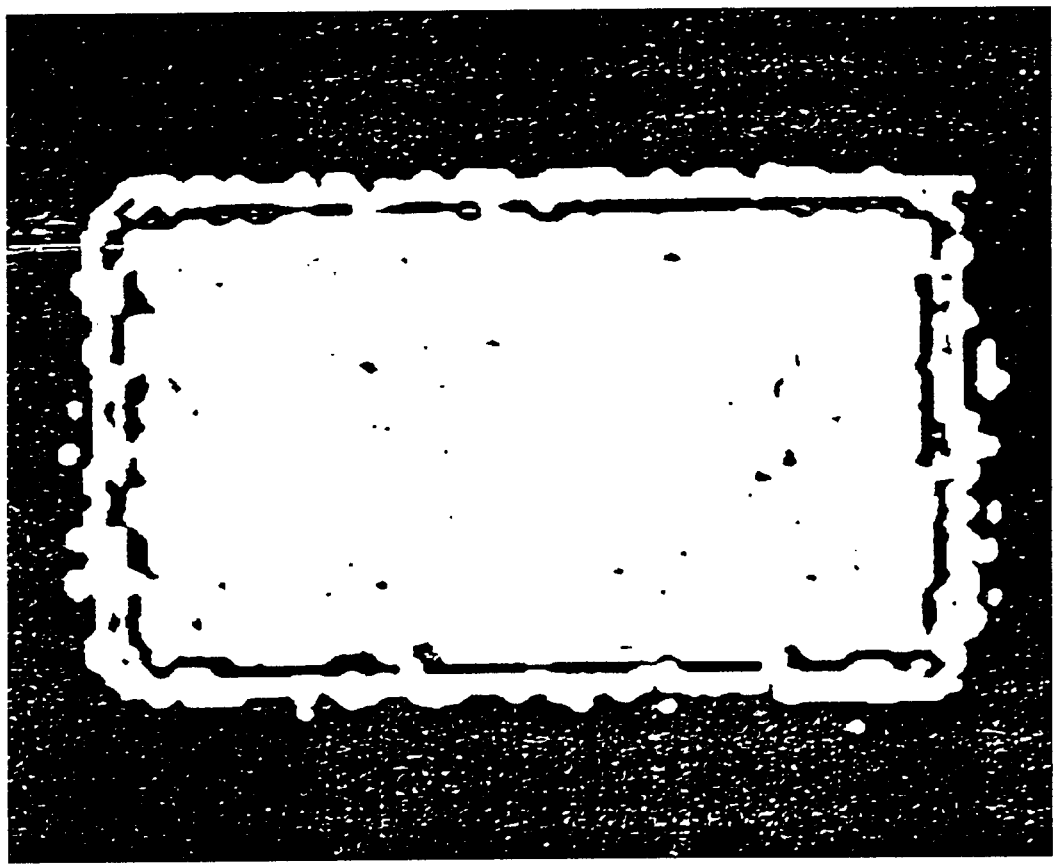
FIG. 10 is a view showing an intensity distribution of the illuminated face of the light bulb by computer simulation in the case where the second lens group is not missing.

FIGS. 9 and 10 show the results of calculating the intensity distributions of illuminating light flux on the illuminated face of the light bulb in the cases where the second lens group is partially missing and the second lens group is not missing, respectively.

In the figures, a whitish portion indicates a high intensity region, and it can be found that a rectangular range assuming an effective area of the light bulb is illuminated.

Also, it can be found that owing to the effect of the light mixing element 3, and the action of the relay lens system 4 for transmitting the light, the light is directed to the illuminated face of the light bulb with highly uniform intensity in FIGS. 9 and 10.

It could be found that the loss of light quantity was suppressed to about 1.5%, notwithstanding the lens system was significantly missing as shown in FIG. 8.

The action of maintaining the illuminating light flux uniform is based on an optical relation of the Fourier transform between the position of the aperture stop 6 of the relay lens system 4 and the illuminated face 5 of the light bulb. From this point of view, the uniformity on the illuminated face 5 of the light bulb can be retained, even if half of the virtual light source images are intercepted near the aperture stop 6.

As shown in FIG. 3, the virtual light source images formed closer to the outer periphery of the lens have a smaller proportion of the light converged portion occupied in a unit area. In the case where the light is intercepted by a cylindrical object such as a lens-barrel of the projection lens, the loss of light quantity can be suppressed relatively lower than the degree of missing lens.

Herein, the reason why the illuminating light flux incident on the illuminated face 5 of the light bulb is maintained uniform even if the virtual light source images are intercepted near the aperture stop 6 will be briefly described.

Now, suppose that three optical faces of A face, B face and C face are arranged on the optical axis, in which B face is a Fourier transformation of A face, and C face is a Fourier transformation of B face.

On the other hand, stating with the relation between an object and an image, the object placed on A face is imaged near C face by lens means disposed near B face.

In terms of the Fourier transform, this is substantially equivalent to "imaging by lens means" involving "two stages of Fourier transform".

Namely, if the light (information) from the object placed on A face is Fourier transformed, a Fourier image is formed on B face, but if the Fourier image is further inversely Fourier transformed, an image almost identical to the object is formed on C face.

In the case of the Fourier transform, there is a relation that the halfway Fourier image (i.e., Fourier image formed on B face) has less significant effect on the final image, even if part of its information is missing.

In the case of the optical system of this lighting system, "a number of light source images" correspond to a Fourier image, and even if a part of the image is missing, there is no significant effect on the quality of final image (i.e., illuminating light flux and its uniformity). However, the quantity of light will diminish.

In principle, even if a lens is divided vertically by a surface containing the optical axis, and half (half circle) of the light is missing, the shape and uniformity of the final image is not affected.

For more details of "Optical Fourier transform", see P. M. Duffieux, "L'INTÉGRALE DE FOURIER ET SES APPLICATIONS A L'OPTIQUE", chap. 5 "Application of convolution, Dirichlet's Theorem", translated by Junpei Tsujiuchi, published by Kyoritsu, 1986, p.65 to 80.

A specific method of designing the relay lens system (transmission lens system) 4 will be described below.

Figure 11:
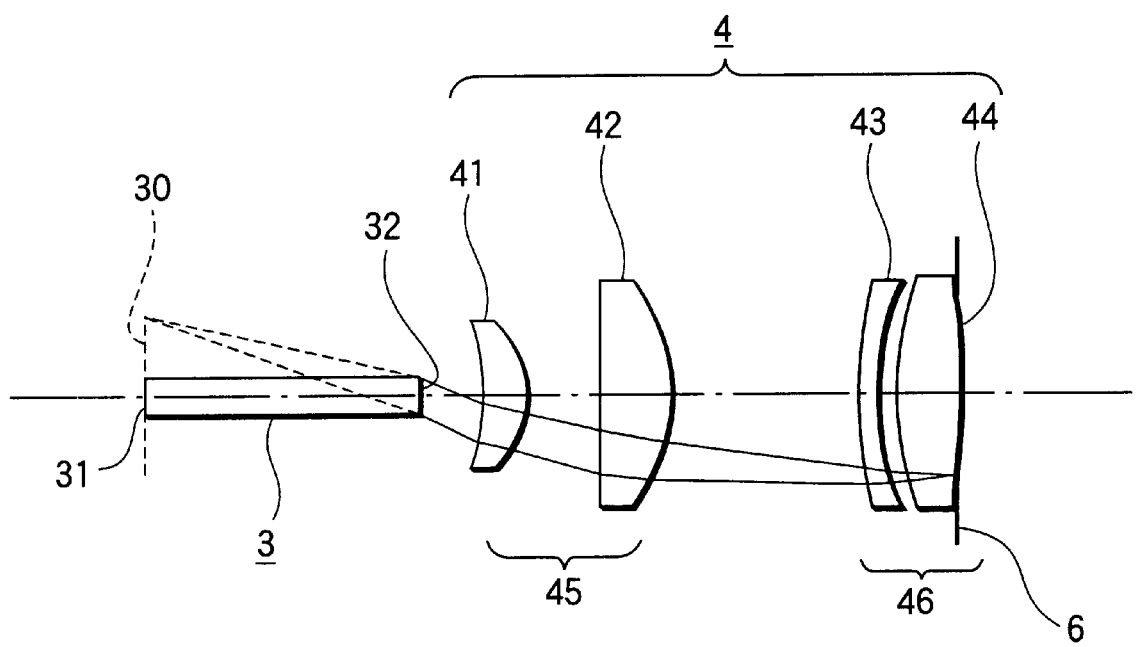
FIG. 11 is a schematic view for explaining the optical system for transmission according to the embodiment 1.

FIG. 11 is a view showing a configuration from the light mixing element 3 to the aperture stop 6. In the figure, the numerals are the same as previously described. The parts are not described again.

In FIG. 11, a behavior how a light emitted from the virtual light source on the virtual light source face 30 arrives at or near the aperture stop 6 is typically shown. As will be apparent from this behavior of the rays of light, the first lens group 45 among the lenses constituting the relay lens system 4 mainly operates to form the virtual light source images near the aperture stop 6.

The second lens group 46, which is closer to the image forming face, does not greatly contribute to the image formation. Such a state is conceptually shown in FIG. 12.

Figure 12:
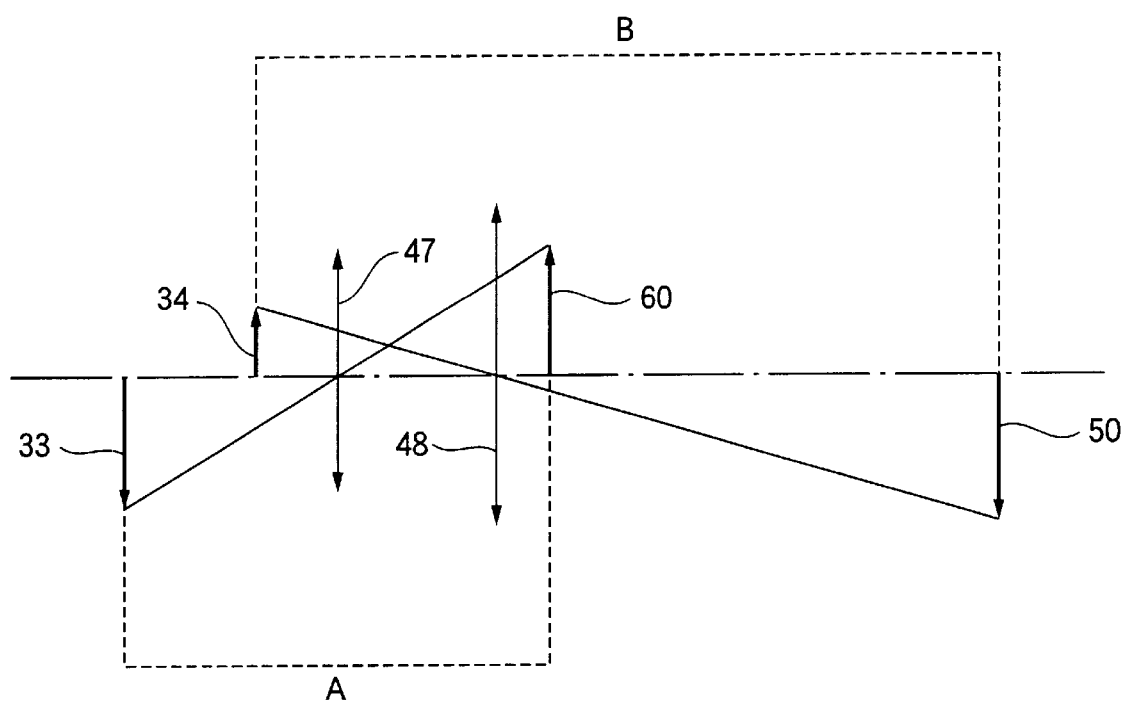
FIG. 12 is a schematic view showing a conjugate relation in the optical system for transmission according to the embodiment 1.

In FIG. 12, reference numeral 33 denotes an arrow representing the size of a virtual light source on the virtual light source face; 34 denotes an arrow representing the size of a uniform face light source formed on the end face of emergence 32 of the light mixing element 3; and 47, 48 denote idealistic thin lenses representing the lens action of the first lens group and the second lens group, respectively. Also, reference numeral 50 denotes an arrow representing the size of the uniform face light source image formed on the illuminated face of the light bulb; and 60 denotes an arrow representing the size of the virtual light source image formed near the aperture stop 6.

As described previously, two conjugate relations hold, including a conjugate relation A between the virtual light source face and its image, and a conjugate relation B between the uniform face light source and its image.

In a specific lens design, these two conjugate relations may be held, but it should be noted that the length of the light mixing element 3 in a direction of optical axis has the significant effect on both the uniformity of the uniform face light source and the image position of the virtual light source, and the positional relation between the image position of the virtual light source and the illuminated face of the light bulb must be apparently equivalent to the relation between the position of the illuminated face of the light bulb and the pupil position of the projection lens.

In the optical system for illumination (lighting system) of this embodiment, the following design was made as an optical system for transmission (i.e., relay lens system 4), besides satisfying such conditions.

First of all, the astigmatism, particularly the distortion and the chromatic aberration are difficult to correct only with a lens having a positive refractive power. Hence, a lens having a negative refractive power was disposed within the second lens group to correct the astigmatism excellently.

The second lens group is made a negative/positive retrofocus configuration, and the longer back focus of the relay lens system 4 is made to get a predetermined image forming magnification without increasing the lens system. Also, the aperture stop 6 on the emergent face of the biconvex lens 44 is provided to form virtual light source images in the vicinity of this aperture stop 6, so that the distortion is excellently corrected.

In this way, it is possible to suppress the size margin amount of the light mixing element which has an almost similar shape as that of the illuminated face 5 of the light bulb, and enhance the utilization efficiency of light.

Supposing that the focal length of all the relay lens system 4 is f0, and the resultant focal length of the first lens group 45 is f1, the resultant focal length f1 of the first lens group 45 in this embodiment satisfies the condition:

$$0.68 < f1/f0 < 0.76 \quad (1)$$

Beyond an upper limit of this conditional expression (1), the refracting power of the second lens group 46 increases, resulting in greater distortion.

Since the principal point interval of the relay lens system 4 is increased, the total length of the relay lens system 4 increases more than required.

On the other hand, below a lower limit of the conditional expression (1), the effective diameter of the relay lens system 4 is increased, which is unfavorable in the respects of the saving space and the costs.

Supposing that the resultant focal length of the second lens group 46 in the relay lens system 4 is f2, the conditional expression $$1.27 < f2/f0 < 1.42 \quad (2)$$

is satisfied only if the expression (1) is satisfied.

A value f2/f0 of the conditional expression (2) varies like the value f1/f0 of the conditional expression (1). The effective range accords with the conditional expression (1)

Supposing that the average Abbe numbers of the material for positive and negative lenses making up the second lens group are vp and vn, respectively, the conditional expression $$vp/vn > 1.7 \quad (3)$$

is satisfied in this embodiment.

It is said that the greater value is more favorable for the a chromatism from the achromatic condition of achromatic lens. Below this value of the conditional expression (3), the full a chromatism is impossible.

If the second lens group 47 is made of a material satisfying the conditional expression (3), the chromatic aberration with magnification can be corrected quite excellently.

Hence, the image on the end face of emergence of the light mixing element 3 can be transmitted efficiently onto the illuminated face 5 of the light bulb, suppressing the coloring around the periphery of the illuminated area, and reducing the size margin of illumination to enhance the utilization efficiency of light.

The numerical value example 1 as listed below in Table 1 includes the data in a region from the optical end face that is the end face of emergence of the light mixing element 3 to the illuminated face 5 of the light bulb in the embodiment 1.

In this data, f0 is a focal length of the total system, f1 is a resultant focal length of the first lens group, f2 is a resultant focal length of the second lens group, ENO is an F number, RED is a paraxial magnification, and ROD is a length of optical axis for the light mixing element.

At the second line in Table, beginning with the left column, item i indicates the order from the object side, Ri indicates a radius of curvature for the ith surface, Di indicates an interval from the ith to (i+1)th surface, nd indicates a refractive index with respect to the d line, and vd indicates an Abbe number.

Note that R=∞ denotes the plane.

The light mixing element 3 is BSC7 (nd=1.5168), with the length along the direction of optical axis being 60 mm.

TABLE 1

Table 1 Example 1 of numerical values
f0 = 27.39 FNO = 3.20 RED = 3.13 ROD = 60 mm

| i | Ri | Di | nd | vd | Focal length | Resultant focal length | |
|---|---|---|---|---|---|---|---|
| Light source face | ∞ | 7.36557 | | | | | |
| 1 | −34.86750 | 5.05304 | 1.517 | 64.2 | 44.00 | f1 | 19.21 |
| 2 | −14.47697 | 1.15032 | | | | | |
| 3 | 36.70926 | 5.20975 | 1.517 | 64.2 | 33.42 | | |
| 4 | −31.24902 | 20.12639 | | | | | |
| 5 | 29.36328 | 1.50000 | 1.673 | 32.2 | −78.14 | f2 | 35.42 |
| 6 | 18.49920 | 3.05695 | | | | | |
| 7 | 31.69847 | 6.67448 | 1.620 | 60.3 | 25.52 | | |
| 8 | −29.30000 | 69.85495 | | | | | |
| Illuminated face | ∞ | 0.00000 | | | | | |

The values of numerical expression corresponding to the conditional expressions (1), (2) and (3) in Example 1 of numerical values are such that:

f1/f0=0.701 f2/f0=1.293 vp/vn=1.95 and all the values can satisfy the conditions.

Note that vp is an average value of the Abbe numbers vd for the positive lenses, and vn is an average value of the Abbe numbers vd for the negative lenses. As will be apparent from Table 1 in the Example 1 of numerical values, there are three positive lenses having the Abbe numbers vd=64.2, 64.2, and 60.4, so that vp is equal to 62.9 that is an average value of them. Also, there is only one negative lens having an Abbe numbr vd=32.2, so that vn is equal to 32.2.

Accordingly, vp/vn is equal to 1.95.

By the way, Example 2 of numerical values as listed in Table 2 and Example 3 of numerical values as listed in Table 3 are design examples of the relay lens system 4 configured in the almost same manner as Example 1 of numerical values.

Like the Example 1 of numerical values, the length of the light mixing element made up of BSC7 in a direction of optical axis was supposed to be 50 mm in either case.

It is possible naturally that the equivalent optical performance can be maintained by reducing the number of lenses and adopting an aspherical lens. In this case, it is considered that the aspherical lens should be introduced into the first lens group 45 in view of the effect of reducing the number of lenses or the condition of effective diameter.

TABLE 2

Table 2 Example 2 of numerical values
f0 = 27.45 FNO = 3.20 RED = 3.13 ROD = 50 mm

| i | Ri | Di | nd | vd | Focal length | Resultant focal length | |
|---|---|---|---|---|---|---|---|
| Light source face | ∞ | 7.09050 | | | | | |
| 1 | −30.32328 | 5.00000 | 1.517 | 64.2 | 36.41 | f1 | 20.21 |
| 2 | −12.29336 | 1.33616 | | | | | |
| 3 | 127.98129 | 6.00000 | 1.517 | 64.2 | 42.15 | | |
| 4 | −25.94787 | 20.02804 | | | | | |

TABLE 2-continued

Table 2 Example 2 of numerical values
f0 = 27.45 FNO = 3.20 RED = 3.13 ROD = 50 mm

| i | Ri | Di | nd | vd | Focal length | Resultant focal length | | |
|---|---|---|---|---|---|---|---|---|
| 5 | 31.90645 | 1.50000 | 1.673 | 32.2 | −84.04 | | f2 | 35.60 |
| 6 | 20.06126 | 2.55749 | | | | | | |
| 7 | 31.34331 | 8.00000 | 1.620 | 60.3 | 26.08 | | | |
| 8 | −30.41084 | 70.19957 | | | | | | |
| Illuminated face | ∞ | 0.00000 | | | | | | |

The values of numerical expression corresponding to the conditional expressions (1), (2) and (3) in Example 2 of numerical values are such that:

f1/f0=0.736 f2/f0=1.297 vp/vn=1.95 and all the values can satisfy the conditions.

TABLE 3

Table 3 Example 3 of numerical values
f0 = 28.15 FNO = 3.20 RED = 3.10 ROD = 50 mm

| i | Ri | Di | nd | vd | Focal length | Resultant focal length | | |
|---|---|---|---|---|---|---|---|---|
| Light source face | ∞ | 5.18223 | | | | | | |
| 1 | −17.99615 | 5.00000 | 1.517 | 64.2 | 30.94 | | f1 | 20.92 |
| 2 | −9.28920 | 8.46481 | | | | | | |
| 3 | 322.29479 | 6.00000 | 1.517 | 64.2 | 45.36 | | | |
| 4 | −25.22199 | 21.54225 | | | | | | |
| 5 | 35.27015 | 2.00000 | 1.673 | 32.2 | −75.07 | | f2 | 39.55 |
| 6 | 20.35195 | 0.46642 | | | | | | |
| 7 | 23.22148 | 6.14429 | 1.620 | 60.3 | 25.91 | | | |
| 8 | −47.85775 | 70.00000 | | | | | | |
| Illuminated face | ∞ | 0.00000 | | | | | | |

The values of numerical expression corresponding to the conditional expressions (1), (2) and (3) in Example 3 of numerical values are such that:

f1/f0=0.743 f2/f0=1.405 vp/vn=1.95 and all the values can satisfy the conditions.

The configuration example of the relay lens system 4 is not limited to the above-described types, but the whole system can be configured only by the positive lenses, for example.

In this case, the performance is different from that of the lens type containing the negative lenses as previously described, but such a simple lens configuration may be employed depending on the level of illumination performance to be obtained.

(Embodiment 2)

Figure 13:
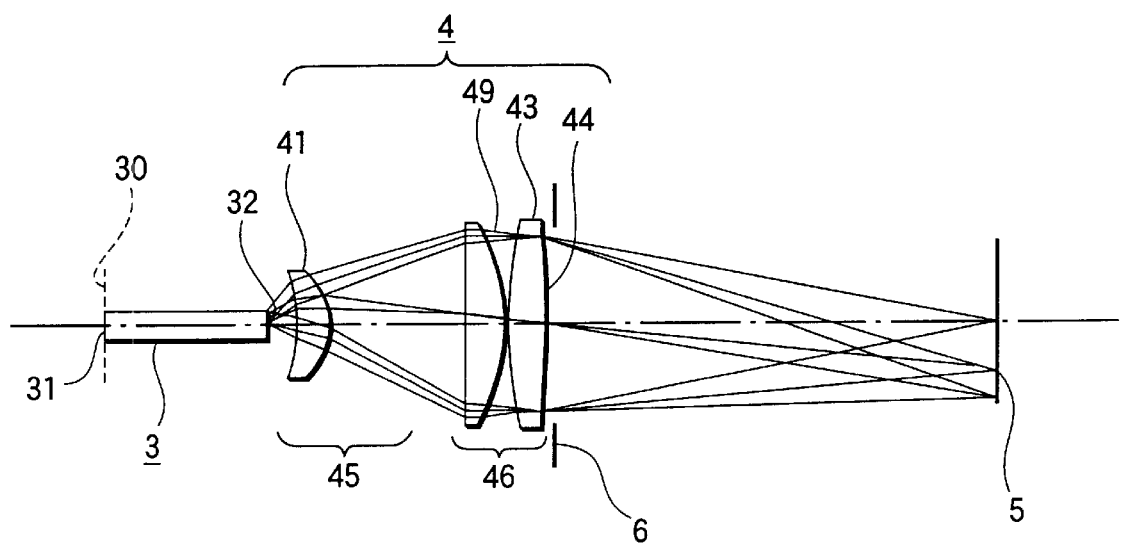
FIG. 13 is a view showing a configuration of an optical system for transmission in an optical system for illumination (lighting system) according to an embodiment 2 of the invention.

FIG. 13 is a view showing a configuration of a relay lens system (also referred to as a lens system for transmission or an optical system for transmission) in an optical system for illumination (lighting system) according to an embodiment 2 of the invention. The relay lens system 4 of this embodiment 2 is characterized by having a first lens group 45 of one positive lens and a second lens group 46 of two positive lenses, in which a basic configuration other than the relay lens system 4 is the same as in the embodiment 1 as shown in FIG. 1.

In FIG. 13, reference numeral 49 denotes a biconvex lens constituting the second lens group. Other reference numerals are the same as previously described.

In this embodiment 2, two lenses 44 and 49 making up the second lens group 46 are positive lenses. Because of no retro-focus configuration, the problem may possibly arise that the image forming magnification is smaller if the lens diameter is limited. Owing to the action of forming virtual light source images near the aperture stop 6, the interference problem can be also solved, in the same way as previously described.

In the illumination performance provided by the optical system for illumination (lighting system) according to this embodiment 2, the quality of a secondary light source face formed on the end face of emergence of the light mixing element 3, that is, the uniform intensity distribution, can be realized to attain the high effects.

Referring to FIG. 1, a system from the light source 1 to the light mixing element 3 will be described below.

The light source 1 as shown in FIG. 1 is a lamp having an illuminant source for emitting a white light or a monochromatic light, preferably, a lamp having a small effective size parameter of illuminant source and a high luminous efficacy, such as a metal halide lamp or an extra-high pressure mercury lamp, for example.

This is because when a light emitted from the Illuminant is converged by the reflector 11, the light converging efficiency can be enhanced.

In this embodiment 2, the shape of the inner surface of the reflector 11 is a paraboloid of revolution that is one of the quadratic surfaces of revolution, and the lamp is arranged so that the illuminant source may be placed near a focal point of this paraboloid.

Light flux made substantially parallel by the reflector 11 is converged by the condenser lens system 2 to form an illuminant source image.

The size and angular distribution of this illuminant source image can be made approximate to the desired values by setting the condenser lens system 2.

In this embodiment 2, the light source 1 is a discharge lamp with an electrode gap length of about 1.3 mm, and the reflector 11 is a paraboloid having a focal length of 7.5 mm. By the use of the condenser lens system 2, an illuminant source image having an effective diameter of about 4 mm is formed.

Of course, it is preferable to configure an optical system for convergence in which the reflector 11 is an ellipsoidal mirror of revolution that is a quadratic surface of revolution without using the condenser lens system 2.

In any way, it is important to form an illuminant source image in accordance with the transmission characteristics of the light mixing element 3 at the latter stage.

The light mixing element 3 can determine the size of end face from an image forming magnification of the relay lens system 4 and a dimension of the illuminated face 5 of the light bulb.

In order to make effective use of the image forming performance of the relay lens system 4, it is desirable that the end face of emergence 32 for the light mixing element 3 has an almost similar shape to that of the illuminated face 5 of the light bulb.

The end face of incidence 31 should be disposed at a position where the illuminant source image is formed to attain the highest transmission efficiency, but due to the large energy density of the incident light, it is important to increase the heat resistance.

Needless to say, it may be possible to vary the shape or size of the plane of incidence and the plane of emergence.
(Embodiment 3)

Figure 14:
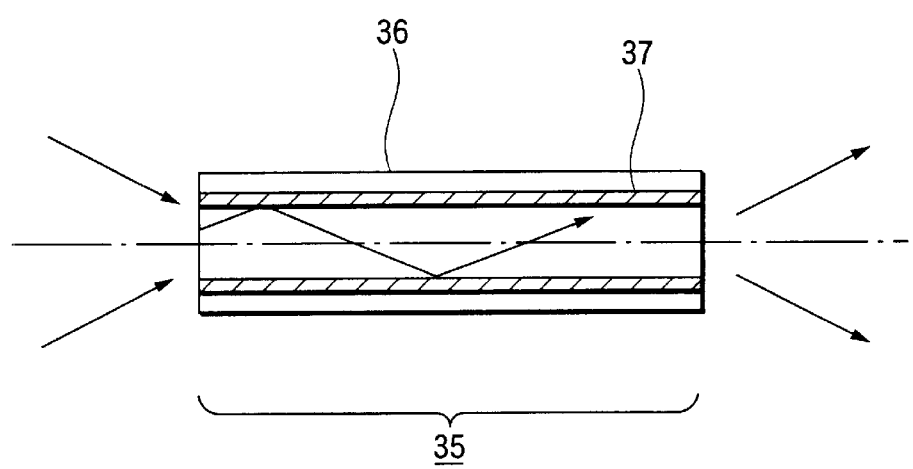
FIG. 14 is a view showing a variation of a light mixing element in an optical system for illumination (lighting system) according to an embodiment 3 of the invention.

FIG. 14 is a cross sectional view showing a variation of the light mixing element. Other basic configuration of the optical system for illumination (lighting system) according to the embodiment 3 is the same as in the previous embodiment 1 or 2.

In FIG. 14, reference numeral 35 denotes a hollow light mixing element; 36 denotes a base substance; and 37 denotes a reflective member. The hollow cylindrical element is formed of four planes.

The reflective member 37 is disposed on a hollow inner face, a light incident from the end face of incidence proceeds while being reflected repetitively from the reflective member 37, forming a light source face with a uniform intensity distribution similar to that of the glass rod as described previously in the vicinity of the end face of emergence.

Generally, in contrast to the rod type based on the total reflection, the use of reflective member is less efficient. However, there are some reflective members having excellent reflection property, heat resistance and weather-ability, which are produced in such a way that a base substance has the surface of aluminum material treated with alumite, aluminum of high purity is deposited in vacuum on the base substance, and an SiO2 film and a TiO2 film are deposited thereon.

As such a material, the MIRO material manufactured by Alanod Inc. (Germany) is preferable.

With such hollow light mixing element 35, a converging point of high energy density can be formed in the space, and the whole element can be made of a metal having high heat radiation effect, so that the total system can be easily cooled.

The reflective performance of the inner face is hardly affected even if the outer wall face is used for holding the element. Hence, a simple method can be used for holding the element and is favorable in the respect of the costs.

Further, using the thin plate material such as MIRO material, the light mixing element can be shaped only by folding a single member, and easily manufactured.
(Embodiment 4)

In the above embodiments 1 to 3, the relay lens system (optical system for transmission) 4 is constituted of the first lens group and the second lens group, using the lens elements. However, the relay lens system (optical system for transmission) 4 may be constituted by combining a concave mirror, a convex mirror, or an aspherical mirror, without using the lens group.

Figure 15:
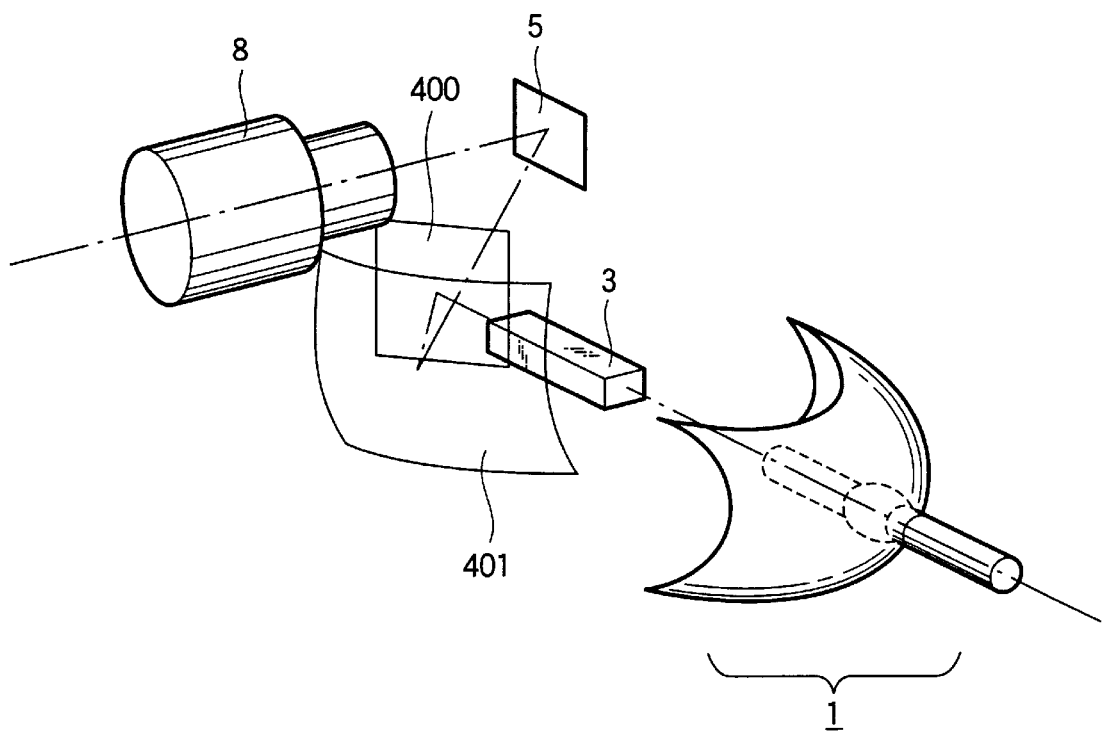
FIG. 15 is a schematic view typically showing a variation of an optical system for transmission according to an embodiment 4 of the invention.

FIG. 15 is a schematic view illustrating an example in which the first and second lens groups of the relay lens system (optical system for transmission) 4 are made up by a combination of the concave mirror, the convex mirror, and the ashperical mirror, instead of the lens elements.

In FIG. 1, reference numeral 1 denotes a light source; 3 denotes a light mixing element; 5 denotes a reflective type light bulb; 8 denotes a projection lens; and 400, 401 denote first and second mirror means that are a concave mirror, a convex mirror, or an aspherical mirror.

A light emergent from the light mixing element 3 is reflected from the first mirror means 400 and the second mirror means 401 in this order, and bent in its optical path to be led to the reflective type light bulb 5.

In the optical system for transmission in this embodiment 4, like the embodiment 1 as shown in FIG. 2, the relay lens system (optical system for transmission) 4 made up of the first mirror means 400 and the second mirror means 401, holds two conjugate relations, that is, a first conjugate relation in which many virtual light source images formed on a virtual light source face 30 are formed near the aperture stop 6, and a second conjugate relation in which a uniform light source face image formed on the end face of emergence 32 are formed near the illuminated face 5 of the light bulb, and causes an illuminating light flux to be emergent in a non-telecentric state from the light end face of emergence.

In this embodiment, since the optical path of the whole system is necessarily bent, there is a high possibility of causing the physical interference between adjacent optical elements. However, the optical system of this embodiment permits the physical interference between the optical system for projection and the optical system for illumination to some extent. Hence, there is the advantage that the degree of freedom is increased in considering the layout of the whole system.

Moreover, if the optical system for illumination (lighting system) is constituted of mirror means wholly, without using the lens group made up of the lens elements, as shown in FIG. 15, the chromatic aberration does not occur in principle, and the utilization efficiency of light can be easily increased.
(Embodiment 5)

Figure 16:
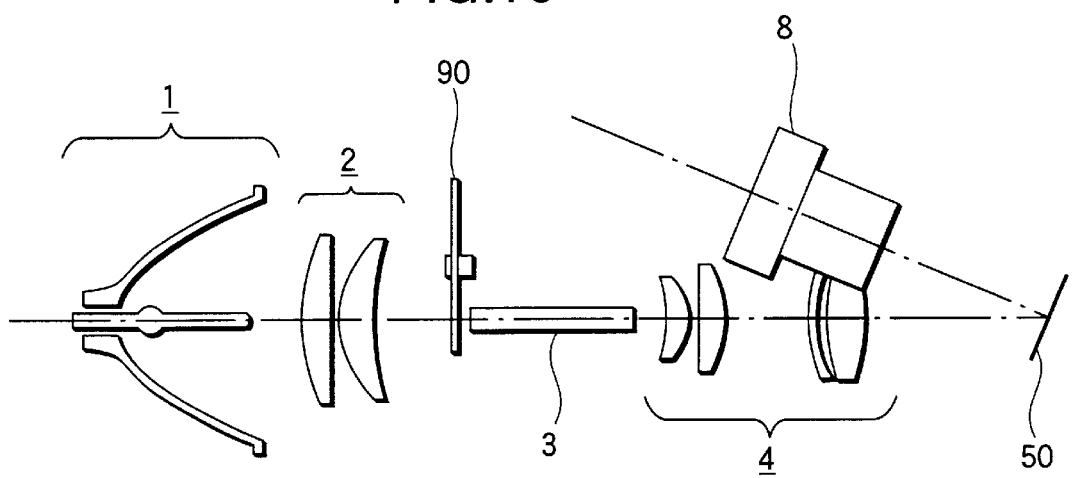
FIG. 16 is a view showing a configuration of a projection type display unit according to an embodiment 5 of the invention.
Figure 17:
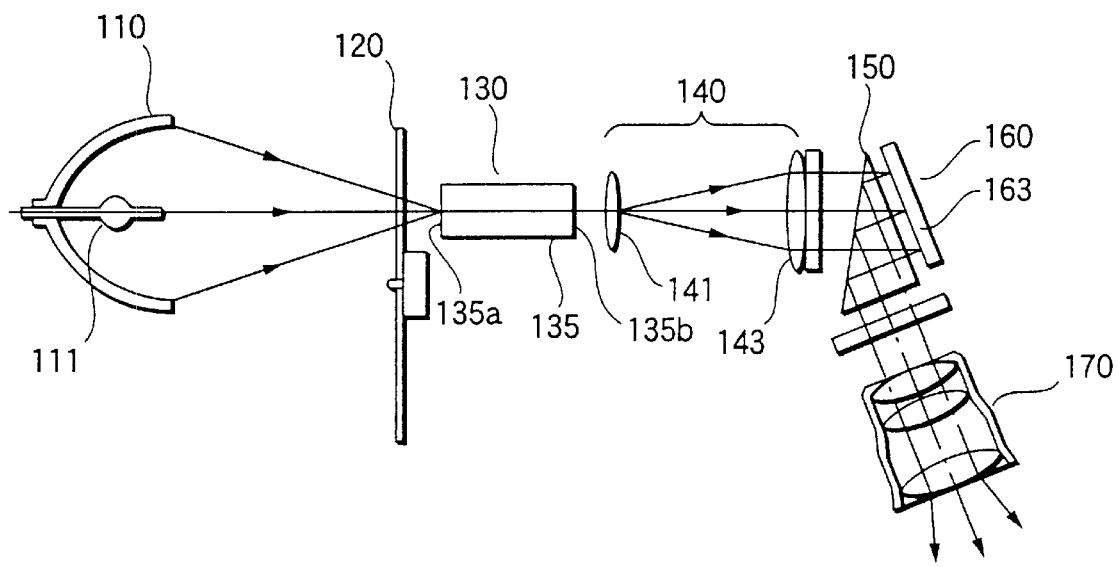
FIG. 17 is a schematic view showing a configuration of a conventional projection type display unit.
Figure 18:
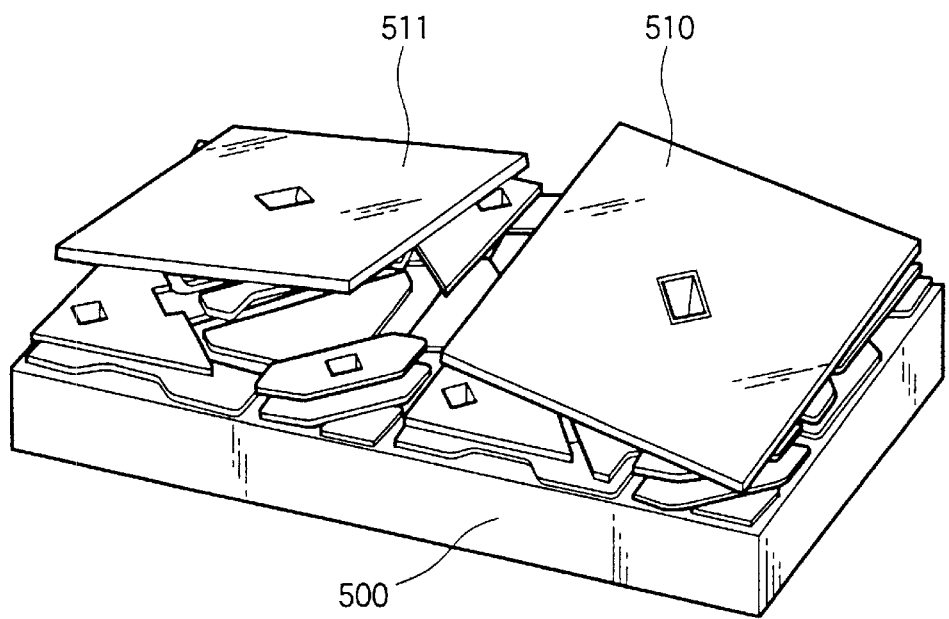
FIG. 18 is a schematic view for explaining the operation of DMD two pixels.
Figure 19:
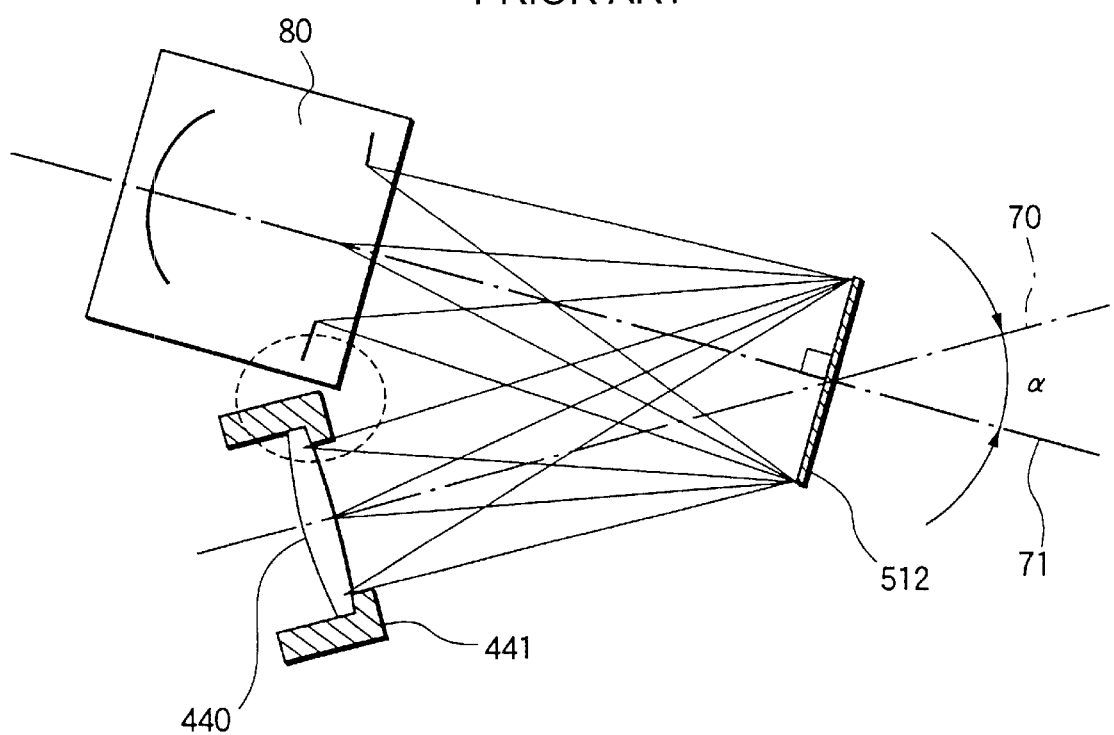
FIG. 19 is a view for explaining the physical interference between an optical system for projection and an optical system for illumination in the conventional optical system in which a DMD is used as image generating means.
Figure 20:
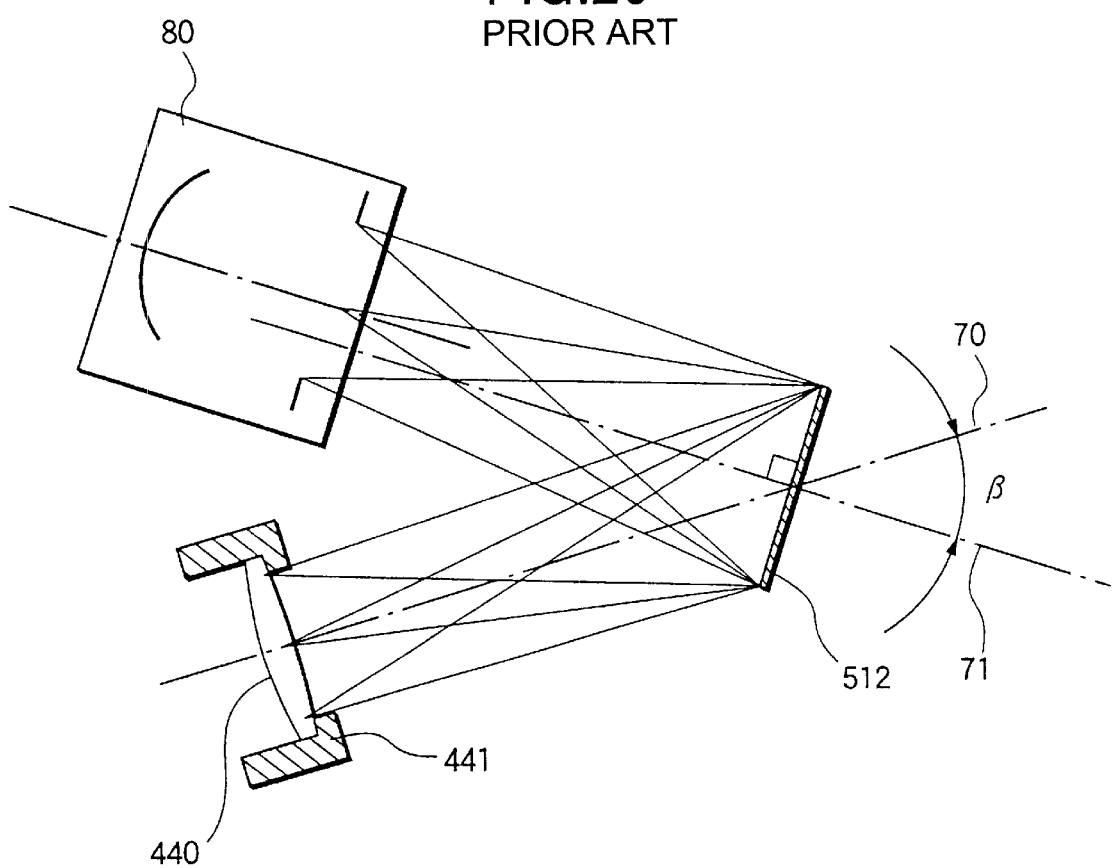
FIG. 20 is a view for explaining an instance of avoiding the physical interference between the optical system for projection and the optical system for illumination in the conventional optical system in which the DMD is used as image generating means.

FIG. 16 is a view illustrating an optical system for a projector apparatus (projection type display unit) of single plate type (i.e., one light bulb) using a rotary color filter.

In FIG. 16, reference numeral 50 denotes a reflection type light bulb, and for the explanation, the light bulb here is supposed to be a DMD (Digital Micromirror Device) made by Texas Instruments Inc.

Reference numeral 90 denotes a rotary color filter. Other numerals are the same as used in the embodiment 1 and shown in FIG. 1, and those parts are not described here.

The rotary color filter 90 is an optical device for effecting the coloring of fields sequentially by revolving in synchronism with a synchronization signal for the video signal, for example, and is highly consistent when the DMD is a reflection type light bulb.

A light emergent from the projection lens 8 is enlarged and projected onto a screen, not shown, to present a large screen image.

Since the optical system for illumination (lighting system) permits some physical interference with the projection lens 8, as described in the embodiment 1, the total conditions for arranging the constituent elements are not only relieved, but also the loss of projecting light amount can be suppressed to the minimum to obtain the uniform projection screen.

Hence, in this embodiment 5, an optical system has very high light utilization efficiency, and is compact and cheap, and a projector device can provide a bright and uniform projection image.

The rotary color filter 90 is desirably placed at a position where the diameter of light flux is smaller in the total optical system for illumination (lighting system), because the total size of the system can be suppressed with the smaller diameter of light flux passing through the rotary color filter 90.

More specifically, it is desirable to place the rotary color filter 90 immediately before or after the light mixing element 3, as shown in FIG. 16.

As for the coloring, the rotary color filter 90 is not necessarily employed, and other coloring means may be disposed in a portion of the optical system, without causing any problems, so long as the coloring means is highly consistent with the optical system for illumination (lighting system), and can provide an efficient projector apparatus.

A lighting system according to the present invention comprises converging means for converging a light emitted from an illuminant and forming a converged image of the illuminant at a predetermined position, a light mixing element for having an end face of incidence near the position at which the converged image of the illuminant is formed, and reducing an irregular luminance of the converged image of the illuminant incident on the end face of incidence to form a uniform light source face on an end face of emergence, and an optical system for transmission for directing an illuminating light flux from the plane of light emergence onto the illuminated face side of a light bulb in a non-telecentric state, a first lens group and a second lens group being arranged in order from the light mixing element side to the illuminated face side of the light bulb, in which a first optical conjugate relation exists between the end face of incidence of the light mixing element and a virtual face at a position of a diaphragm disposed in the vicinity of a lens means final face closest to the illuminated face constituting the second lens group in terms of the first lens group and the second lens group, and a second optical conjugate relation exists between the end face of emergence of the light mixing element and the illuminated face. Hence, there is an optical conjugate relation between the light source face having a uniform intensity distribution formed on the end face of emergence of the light mixing element and the illuminated face of the light bulb, and a great number of light source images of the illuminant are formed in the vicinity of the diaphragm set up on the final face of the second lens group. Therefore, even if a part of the illuminating light flux directed from the second lens group to the illuminated face of the light bulb is physically missing, there is no effect on the uniform illumination on the illuminated face. As a result, the light system for the projection type display unit that has high light utilization efficiency can be provided.

In the lighting system according to the invention, the second lens group of the optical system for transmission is comprised of a meniscus lens having a negative refracting power with a convex face directed toward the light mixing element, and a lens having a positive refracting power, which are arranged in order from the light mixing element side. Hence, the high quality lighting system can be provided by correcting the astigmatism.

In the lighting system according to the invention, the first lens group of the optical system for transmission consists of one positive lens and the second lens group consists of two positive lenses. Therefore, the optical system for transmission has a simple configuration of lenses, making it possible to produce the lighting system cheaply.

In the lighting system according to the invention, the light mixing element is shaped like a hollow cylinder formed by folding a single reflective member. Hence, the outer wall face of the light mixing element may be utilized for holding it, in which the reflective performance of the inner face is hardly affected. As a result, the lighting system can be produced cheaply by holding the lighting mixing element in simple manner.

In the lighting system according to the invention, at least one of the first lens group and the second lens group of the optical system for transmission is a concave mirror or a convex mirror. Hence, the high quality lighting system with high utilization efficiency can be provided because the chromatic aberration is reduced.

Further, since the optical path of the optical system for illumination can be bent, the compact lighting system can be provided.

A projection type display unit according to the invention comprises a lighting system according to any one of aspects 1 to 5, a light bulb having a great number of pixels in a two-dimensional array structure that are illuminated by a light flux in a non-telecentric state that is emergent from an optical system for transmission of the lighting system, and that are driven independently of each other, and projection lens means for projecting the light emergent from the light bulb onto screen means. Even if a part of the illuminating light flux directed from the second lens group of the lighting system onto the illuminated face of the light bulb is physically missing, the projection type display unit can be provided which has high utilization efficiency without having influence on the uniform illumination onto the illuminated face.

In the projection type display unit according to this invention, an optical system for transmission in a lighting system has a first lens group and a second lens group arranged in order from the light mixing element side to the illuminated face side of a light bulb, the first lens group consisting of at least one meniscus lens having a positive refracting power, and the second lens group consisting of first lens means having a negative refracting power and second lens means having a positive refracting power in a region from the light mixing element side to the illuminated face side of the light bulb, the first lens means and the second lens means being arranged in order from the light source side, in which an illuminating light flux is made emergent in a non-telecentric state from the optical system for transmission, and a relation $$0.68 < f1/f0 < 0.76$$

is satisfied, where the focal length of an overall optical system for transmission is f0 and the focal length of the first lens group is f1. Therefore, it is possible to prevent the increased distortion in the optical system for transmission of the lighting system, and effect the saving space. Consequently, the high quality, compact projection type display unit can be provided.

In the projection type display unit according to the invention, a lighting system has a rotary color filter arranged immediately before or after the light mixing element. Therefore, the projection type display unit can be provided which has high light utilization efficiency, and is cheap and compact.

What is claimed is:
1. A lighting system comprising:
    converging means for converging a light emitted from an illuminant and forming a converged image of said illuminant at a predetermined position;
    a light mixing element for having an end face of incidence near the position at which said converged image of said illuminant is formed, and reducing an irregular luminance of said converged image of said illuminant incident on said end face of incidence to form a uniform light source face on an end face of emergence; and
    an optical system for transmission for directing an illuminating light flux from the plane of light emergence onto the illuminated face side of a light bulb in a non-telecentric state, a first lens group and a second lens group being arranged in order from said light mixing element side to the illuminated face side of said light bulb, in which a first optical conjugate relation exists between the end face of incidence of said light mixing element and a virtual face at a position of a aperture stop disposed in the vicinity of a lens means final face closest to the illuminated face constituting said second lens group in terms of said first lens group and said second lens group, and a second optical conjugate relation exists between the end face of emergence of said light mixing element and said illuminated face.

2. The lighting system according to claim 1, wherein said second lens group of the optical system for transmission includes:
   a meniscus lens having a negative refracting power with a convex face directed toward said light mixing element, and
   a lens having a positive refracting power, which are arranged in order from the light mixing element side.

3. The lighting system according to claim 1, wherein said first lens group of the optical system for transmission includes one positive lens, and
said second lens group includes two positive lenses.

4. The lighting system according to claim 1, wherein said light mixing element is shaped like a hollow cylinder formed by folding a single reflective member.

5. The lighting system according to claim 1, wherein at least one of said first lens group and said second lens group of the optical system for transmission is a concave mirror or a convex mirror.

6. A projection type display unit comprising:
a lighting system according to any one of claims 1 to 5;
a light bulb having a great number of pixels in a two-dimensional array structure that are illuminated by a light flux in a non-telecentric state that is emergent from an optical system for transmission of said lighting system, and that are driven independently of each other; and
projection lens means for projecting the light emergent from said light bulb onto screen means.

7. The projection type display unit according to claim 6, wherein
an optical system for transmission in a lighting system has a first lens group and a second lens group arranged in order from the light mixing element side to the illuminated face side of a light bulb,
said first lens group includes at least one meniscus lens having a positive refracting power, and
said second lens group includes first lens means having a negative refracting power and second lens means having a positive refracting power in a region from said light mixing element side to the illuminated face side of the light bulb, said first lens means and said second lens means being arranged in order from the light source side, in which an illuminating light flux is made emergent in a non-telecentric state from said optical system for transmission, and a relation $$0.68 < f1/f0 < 0.76$$

is satisfied, where the focal length of an overall optical system for transmission is f0 and the focal length of said first lens group is f1.

8. The projection type display unit according to claim 6, wherein
a lighting system has a rotary color filter arranged immediately before or after said light mixing element.

* * * * *